(12) United States Patent  
Cho

(10) Patent No.: US 10,423,223 B2
(45) Date of Patent: Sep. 24, 2019

(54) METHOD AND DEVICE FOR DISPLAYING CONTENT

(71) Applicant: SAMSUNG ELECTRONICS CO., LTD., Suwon-si, Gyeonggi-do (KR)

(72) Inventor: Hyung-rae Cho, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/534,721

(22) PCT Filed: Dec. 10, 2015

(86) PCT No.: PCT/KR2015/013495
§ 371 (c)(1),
(2) Date: Jun. 9, 2017

(87) PCT Pub. No.: WO2016/093633
PCT Pub. Date: Jun. 16, 2016

(65) Prior Publication Data
US 2018/0247607 A1 Aug. 30, 2018

(30) Foreign Application Priority Data

Dec. 12, 2014 (KR) ........................ 10-2014-0179353

(51) Int. Cl.
G06F 3/01 (2006.01)
H04N 5/445 (2011.01)
(Continued)

(52) U.S. Cl.
CPC .............. G06F 3/013 (2013.01); G09G 3/20 (2013.01); G09G 5/026 (2013.01); G09G 5/14 (2013.01);
(Continued)

(58) Field of Classification Search
None
See application file for complete search history.

(56) References Cited

U.S. PATENT DOCUMENTS

2009/0310149 A1* 12/2009 Kawasaki ............ H04N 1/6022
358/1.8
2012/0256823 A1* 10/2012 Lee ........................ G06F 3/011
345/156
(Continued)

FOREIGN PATENT DOCUMENTS

KR 10-2014-0017420 2/2014
KR 10-2014-0033652 3/2014
(Continued)

OTHER PUBLICATIONS

Search Report and Written Opinion dated Mar. 22, 2016 in counterpart International Patent Application No. PCT/KR2015/013495.

Primary Examiner — Yanna Wu
(74) Attorney, Agent, or Firm — Nixon & Vanderhye, P.C.

(57) ABSTRACT

A method of displaying content on a device includes sensing first color information of at least one object reflected on a transparent display of the device; comparing second color information of content displayed on the transparent display with the first color information; and changing the second color information based on a difference between the first color information and the second color information.

13 Claims, 10 Drawing Sheets

(51) Int. Cl.
*H04N 21/43* (2011.01)
*H04N 21/431* (2011.01)
*H04N 21/414* (2011.01)
*G09G 3/20* (2006.01)
*G09G 5/02* (2006.01)
*G09G 5/14* (2006.01)
*G09G 5/00* (2006.01)
*G06F 3/0481* (2013.01)
*G06F 3/14* (2006.01)
*H04N 9/74* (2006.01)

(52) U.S. Cl.
CPC ....... *H04N 5/445* (2013.01); *H04N 21/41407* (2013.01); *H04N 21/43* (2013.01); *H04N 21/431* (2013.01); *H04N 21/4312* (2013.01); *G09G 2310/0221* (2013.01); *G09G 2310/04* (2013.01); *G09G 2320/028* (2013.01); *G09G 2320/0666* (2013.01); *G09G 2320/0686* (2013.01); *G09G 2360/144* (2013.01); *H04N 9/74* (2013.01)

(56) References Cited

U.S. PATENT DOCUMENTS

| | | | |
|---|---|---|---|
| 2013/0265232 A1* | 10/2013 | Yun | G09G 3/3208 345/158 |
| 2014/0035942 A1 | 2/2014 | Yun et al. | |
| 2014/0070081 A1 | 3/2014 | Spraggs et al. | |
| 2014/0075349 A1 | 3/2014 | Yun et al. | |
| 2014/0204023 A1 | 7/2014 | Kumar et al. | |
| 2014/0313218 A1 | 10/2014 | Lee et al. | |
| 2015/0371579 A1 | 12/2015 | Yu et al. | |

FOREIGN PATENT DOCUMENTS

| | | |
|---|---|---|
| KR | 10-2014-0094393 | 7/2014 |
| KR | 10-2014-0124981 | 10/2014 |
| WO | 2014/104858 | 7/2014 |

\* cited by examiner

METHOD AND DEVICE FOR DISPLAYING CONTENT

This application is the U.S. national phase of International Application No. PCT/KR2015/013495 filed 10 Dec. 2015, which designated the U.S. and claims priority to KR Patent Application No. 10-2014-0179353 filed 12 Dec. 2014, the entire contents of each of which are hereby incorporated by reference.

TECHNICAL FIELD

The present invention relates to a method and device for displaying content.

BACKGROUND ART

Different types of image display devices that can display various information on a screen to be seen by human eyes have been developed using various technologies. In particular, with the development of transparent materials for use in transparent electronic devices having a certain transmittance, displays including transparent electronic devices have been developed.

In the case of displays including transparent electronic devices, new methods of displaying content are required due to different characteristics between conventional displays and displays based on transparent electronic devices. In the case of the transparent displays, objects located around a device including transparent displays may be reflected on the transparent displays, and thus, it may be hard for a user to recognize content displayed by the transparent displays. Accordingly, research into methods of more effectively displaying content on transparent displays is needed.

SUMMARY

Embodiments disclosed herein relate to a method of displaying content on a device including a transparent display and the device including the transparent display.

A method of displaying content on a device includes: sensing first color information of at least one object reflected on a transparent display of the device; comparing second color information of content displayed on the transparent display with the first color information; and changing the second color information based on a difference between the first color information and the second color information.

DETAILED DESCRIPTION OF EXAMPLE EMBODIMENTS

Figure 1:
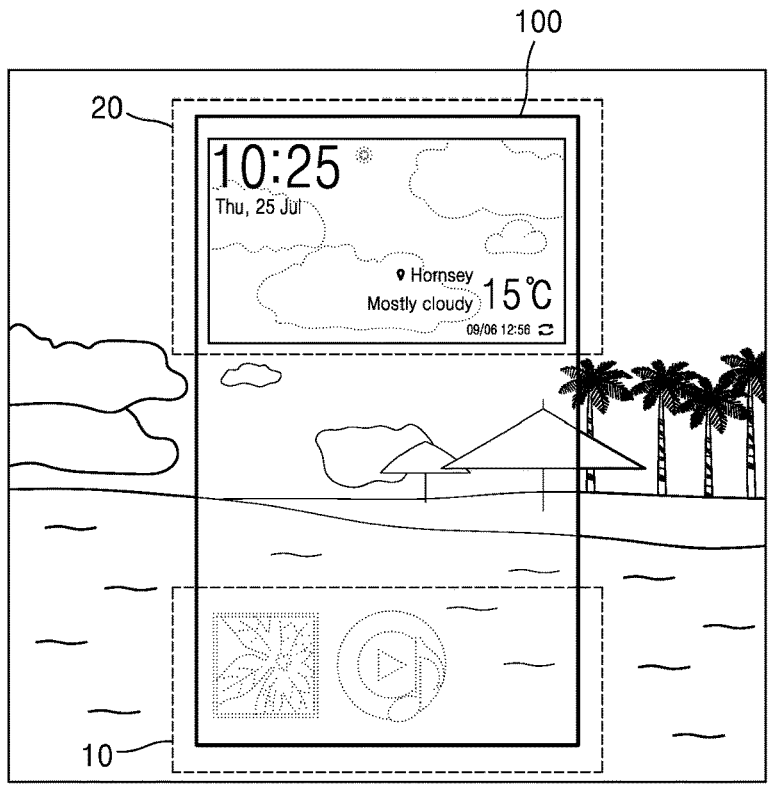
FIG. 1 is a conceptual view for describing a method used by a device to provide content, according to an embodiment.

According to an aspect of the present invention, there is provided a method of displaying content on a device, the method including: sensing first color information of at least one object reflected on a transparent display of the device; comparing second color information of content displayed on the transparent display with the first color information; and changing the second color information based on a difference between the first color information and the second color information.

The changing of the second color information may include changing the second color information when the difference between the first color information and the second color information is included in a pre-determined critical range.

The changing of the second color information may include changing the second color information such that the difference between the second color information and the first color information exceeds the predetermined critical range.

The method may further include sensing an eye direction of a user; and determining the at least one object reflected on the transparent display, based on the sensed eye direction, wherein the sensing of the first color information includes sensing the first color information of the determined at least one object.

The changing of the second color information may include dividing the transparent display into a plurality of areas, based on a degree of the difference between the first color information, and the second color information displayed on the transparent display; selecting an area, whereby the difference between the first color information and the second color information is included in a pre-determined critical range, from among the divided plurality of areas; and changing color information of the selected area.

The method may further include generating an image corresponding to an object reflected on a first transparent display of the device; and based on a difference between second color information of content displayed on a second transparent display of the device, and first color information of the generated image, combining the content displayed on the second transparent display with the generated image.

The method may further include, based on color information of an image of a first object reflected on a first transparent display and an image of a second object reflected on a second transparent display, determining at least one transparent display on which content output from the device is to be displayed.

The changing of the second color information may include determining the second color information that is changed, based on types of obtained user inputs.

According to another aspect of the present invention, there is provided a device for displaying content, the device including: a sensor configured to sense first color information of at least one object reflected on a transparent display of the device; a controller configured to compare second color information of content displayed on the transparent display with the first color information, and based on a difference between the first color information and the second color information, change the second color information; and an output unit configured to output the content according to the changed second color information.

The controller may be configured to change the second color information when the difference between the first color information and the second color information is included in a pre-determined critical range.

The controller may change the second color information such that the difference between the second color information and the first color information exceeds the predetermined critical range.

The sensor may be configured to sense an eye direction of a user, and the controller may be configured to determine the at least one object reflected on the transparent display, based on the sensed eye direction, and may sense the first color information of the determined at least one object.

The controller may be configured to divide the transparent display into a plurality of areas based on a degree of the difference between the first color information, and the second color information displayed on the transparent display, select an area, whereby the difference between the first color information and the second color information is included in a pre-determined critical range, from among the divided plurality of areas, and change color information of the selected area.

The controller may be configured to generate an image corresponding to an object reflected on a first transparent display of the device, and based on a difference between second color information of content displayed on a second transparent display of the device, and first color information of the generated image, combine the content displayed on the second transparent display with the generated image.

The controller may be configured to determine at least one transparent display on which content output from the device is to be displayed, based on color information of an image of a first object reflected on a first transparent display and an image of a second object reflected on a second transparent display.

The controller may be configured to determine the second color information that is changed, based on types of obtained user inputs.

Hereinafter, the present invention will be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. In the drawings, like reference numerals denote like elements. Also, while describing the present invention, detailed descriptions about related well known functions or configurations that may blur the points of the present invention are omitted.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

In this specification, "content" may denote various information produced, processed, and distributed in a digital method with the sources of texts, signs, voices, sounds, images, etc. to be used in a wired or wireless electrical communication network, or all the content included in the information. The content may include at least one of texts, signs, voices, sounds, and images that are output on a screen of a device when an application is executed. The content may include, for example, an electronic book (e-book), a memo, a picture, a movie, music, etc. However, it is only an embodiment, and the content of the present disclosure is not limited thereto.

In this specification, "applications" refer to a series of computer programs for performing specific operations. The applications described in this specification may vary. For example, the applications may include a camera application, a music playing application, a game application, a video playing application, a map application, a memo application, a diary application, a phone-book application, a broadcasting application, an exercise assistance application, a payment application, a photo folder application, etc. However, the applications are not limited thereto.

Hereinafter, the present disclosure will be described in detail by referring to the accompanying drawings.

FIG. 1 is a conceptual view for describing a method used by a device 100 to provide content, according to an embodiment.

The device 100 may display at least one piece of content according to an application that is executed on the device 100. For example, when a messenger application is executed on the device 100, the device 100 may display content in which texts, signs, and images are combined. The texts, signs, and images refer to messages exchanged between the device 100 and other devices, images indicating user information of other devices, etc.

The device 100 according to an embodiment may include at least one transparent display. For example, a portion of the device 100, on which content is output, may be a transparent display or the whole device 100 may be a transparent display.

At least one object located around the device 100 may be reflected on the transparent display included in the device 100. When the at least one object is reflected on the transparent display, the device 100 may sense first color information of the at least one object reflected on the transparent display.

For example, when a user gazes at the transparent display of the device 100 at a first location, an object that is located opposite the first location, with respect to the device 100, may be reflected on the device 100. When the object located opposite the first location is reflected on the transparent display of the device 100, the device 100 may sense the first color information of the object reflected on the transparent display.

Also, the device 100 may display content on the transparent display when an application is executed on the device 100. The device 100 may obtain second color information of the content that is displayed. For example, when a menu application is executed on the device 100, icons 10 indicating executable applications and a window 20 displaying weather, time, and date may be displayed on the transparent display of the device 100. The device 100 may obtain color information of the icons 10 and color information of the window 20 displaying weather, time, and date.

The device 100 may compare the first color information and the second color information. When the device 100 includes a transparent display, the second color information of the content that a user may obtain may be determined based on the first color information of the object reflected on the device 100. For example, when the first color information reflected on the transparent display of the device 100 and the second color information of the content 10 and the window 20 displayed on the device 100 are similar to each other, the user may not recognize the content 10 and the window 20. Thus, the device 100 may compare the first color information and the second color information and change the second color information of the content 10 and the window 20 that are displayed, based on a difference between the first color information and the second color information.

The device 100 may determine the second color information that is changed, based on types of content. For example, based on a user setting, the device 100 may change the second color information of the first content 10, which the user does not wish to recognize, to be similar to the first color information. As another example, the device 100 may change the second color information of the second content 20, which the user wishes to recognize, such that the second color information has a great color difference from the first color information. A criterion based on which the device 100 changes the second color information may vary according to a user setting.

The device 100 may be a smart phone, a cellular phone, a personal digital assistant (PDA), a laptop computer, a media player, a global positioning system (GPS) device, or any other mobile or non-mobile computing device. However, the device 100 is not limited thereto.

Figure 2:
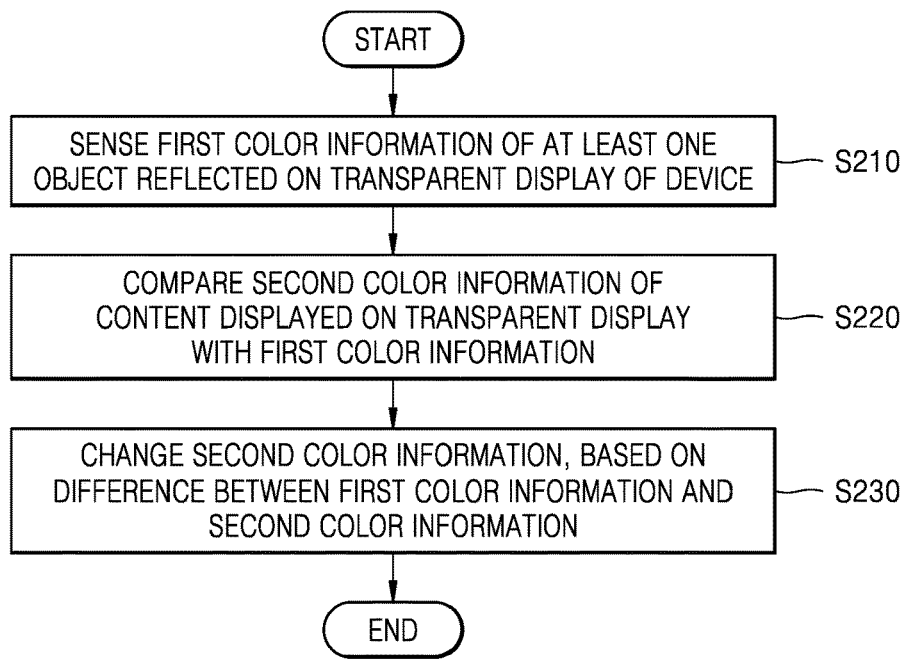
FIG. 2 is a flowchart of a method used by a device to display content, according to an embodiment.

FIG. 2 is a flowchart of a method used by the device 100 to display content, according to an embodiment.

In operation S210, the device 100 may sense first color information of an object reflected on a transparent display. At least one object located around the device 100 may be reflected on the device 100. For example, when the device 100 is placed on a table, the table may be reflected on the transparent display of the device 100. The device 100 may sense the first color information of the reflected object. For example, the device 100 may sense the first color information of the table.

The first color information of the at least one object reflected on the device 100 may vary depending on an eye direction of a user. For example, when the user gazes at the device 100 from a first direction, an object that is at a location corresponding to the first direction may be reflected on the device 100.

The device 100 may sense the eye direction of the user and determine the object corresponding to the eye direction. The device 100 may sense the first color information of the determined object. For example, when the user gazes at the device 100 from a horizontal direction, the device 100 may determine a cup, which is located opposite the user in the horizontal direction based on the device 100, as the object. The device 100 may sense color information of the cup. As another example, when the user gazes at the device 100 from a diagonal direction, the device 100 may determine a chair located opposite the user in the diagonal direction based on the device 100, as the object. The device 100 may sense color information of the chair.

In operation S220, the device 100 may compare second color information of content displayed on the transparent display, with the first color information.

The device 100 may display at least one piece of content, based on an application that is executed thereon. For example, when a photo storage application is executed on the device 100, the device 100 may display a list of stored photos.

The device 100 may obtain the second color information of the content displayed on the transparent display. The device 100 may obtain the second color information of the content, by using metadata with respect to the application. The metadata with respect to the application may include information about a type, a size, an output location, and a color of content that is output when the application is executed.

When the list of stored photos is displayed on the device 100 which is laid on a table, the device 100 may compare the first color information of the table reflected on the device 100 with the second color information of the displayed list of stored photos.

The device 100 according to an embodiment may compare the first color information with the second color information, based on a conventional color rendering table in which a spectrum of colors is displayed as a circle. For example, the device 100 may compare a location of the first color information with a location of the second color information in the color rendering table. However, it is only an embodiment, and methods of comparing the first color information with the second color information are not limited thereto.

In operation S230, the device 100 may change the second color information, based on a difference between the first color information and the second color information. In this case, methods of changing the second color information may vary according to a user's setting.

According to an embodiment, the device 100 may change the second color information such that the difference between the first color information and the second color information is equal to or greater than a pre-determined value. When a difference between the location of the first color information and the location of the second color information in the color rendering table is less than a critical value, it may be difficult for a user to recognize the second color information of the content that is output on the device 100. Thus, the device 100 may change the second color information such that it may be easy for the user to recognize the second color information.

For example, the device 100 may change the second color information such that the second color information has a complementary color relationship with the first color information. For example, when a first color of the object reflected on the device 100 is red and a second color of the content displayed on the device 100 is orange, the device 100 may change the second color of the content as green, which is in a complementary relationship with red.

However, this is only an embodiment. The device 100 may change the second color information such that the difference between the first color information and the second color information is less than the critical value. When the difference between the first color information and the second color information is less than the critical value, it may be difficult for the user of the device 100 to recognize the second color information. The device 100 may change the second color information of a piece of content as similar to the first color information so that the piece of content from among a plurality of pieces of content output on the device 100 is not recognizable to the user.

The device 100 may change the second color information of the content, based on an obtained user input. According to an embodiment, the device 100 may determine an extent within which the second color information of the content is changed, according to a user input. For example, when the device 100 obtains a touch input of a user, and a length of the touch input is two seconds, the device 100 may change the second color information of the content such that a difference between the second color information of the content and the first color information of the object is a. As another example, when the device 100 obtains a touch input of a user, and a length of the touch input is four seconds, the device 100 may change the second color information of the content such that the difference between the second color information of the content and the first color information of the object is 2a.

Figure 3:
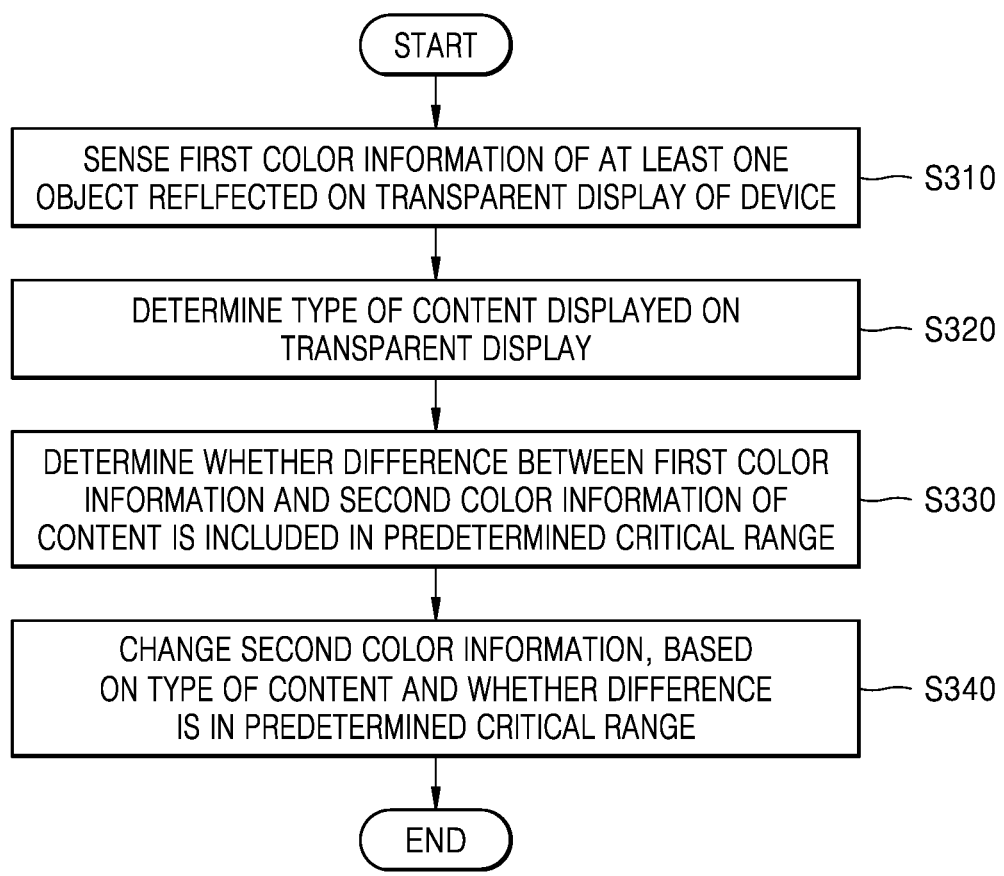
FIG. 3 is a flowchart of a method used by a device to determine a color of displayed content based on the type of content, according to an embodiment.

FIG. 3 is a flowchart of a method used by the device 100 to determine a color of displayed content, based on the type of content, according to an embodiment.

In operation S310, the device 100 may sense first color information of at least one object reflected on a transparent display. At least one object located around the device 100 may be reflected on the device 100.

The first color information of the at least one object reflected on the device 100 may vary based on an eye direction of a user. The device 100 may sense the eye direction of the user and determine an object corresponding to the eye direction. The device 100 may sense the first color information of the determined object.

Operation S310 may correspond to operation S210 described with reference to FIG. 2.

In operation S320, the device 100 may determine a type of content displayed on the transparent display.

The device 100 may determine an application displayed on an uppermost layer of a plurality of layers on which at least one application that is executed may be displayed. The device 100 may determine the type of content displayed by using metadata of the determined application.

For example, when a web application, a messenger application, and a memo application are executed on the device 100, the device 100 may determine the messenger application which is displayed on the uppermost layer. The device 100 may determine that the displayed content is a message including a text and a sign, by using the metadata of the messenger application.

In operation S330, the device 100 may determine whether a difference between the first color information and second color information of the content is included in a predetermined critical range.

The device 100 according to an embodiment may compare the first color information and the second color information based on a conventional color rendering table displaying a spectrum of colors as a circle. For example, the device 100 may compare a location of the first color information and a location of the second color information in the color rendering table.

The critical range may indicate a range whereby the second color information of the content may be recognized by a user based on the first color information of the object reflected on the transparent display. The critical range may be set as a predetermined value or may be set to vary depending on a user in consideration of a color recognition ability of each user. For example, when a difference between the first color information and the second color information, whereby the user may recognize the second color information, corresponds to a location difference that is equal to or greater than three spaces in the color rendering table, the critical range may be set as the location difference that is equal to or greater than three spaces in the color rendering table. The device 100 may determine whether a difference of locations between the first color information and the second color information in the color rendering table is equal to or greater than three spaces, according to the set critical range.

In operation S340, the device 100 may change the second color information based on the type of content and whether the difference between the first color information and the second color information is included in the critical range.

A plurality of pieces of content may be displayed on the device 100. For example, when a menu application is executed on the device 100, the device may display icons indicating a plurality of applications which may be executed on the device 100. Meanwhile, while the menu application is executed, messages sent to a user may be displayed on the device 100. The second color information of the applications displayed on the device 100 and the second color information of the messages displayed on the device 100 may be recognized differently based on the first color information of the object reflected on the transparent display of the device 100.

When the device 100 receives a message, the device 100 may change the color information of the message displayed on the device 100 and the color information of the icons displayed on the device 100, such that the user may recognize only the received message. In the case of a transparent display, the second color information of the content, which is recognized by the user, is different according to the first color information of the reflected object, and thus, the device 100 may display the color information of the icons differently from the color information of the message, by taking into account the first color information of the reflected object.

For example, when a difference between the color information of the message and the first color information of the reflected object is not included in the critical range, the device 100 may change the color information of the message such that the user may easily recognize the message. The device 100 may change the color information of the message such that the color information of the message has a complementary color relationship with the first color information of the reflected object. Meanwhile, when a difference between the color information of the message and the color information of the reflected object is included in the critical range, the device 100 may not change the color information of the message.

When a difference between the color information of the icons indicating the applications and the first color information of the reflected object is not included in the critical range, the device 100 may not change the color information of the icons so that the user may have difficulty recognizing the icons. As another example, when the difference between the color information of the icons indicating the applications and the first color information of the reflected object is included in the critical range, the device 100 may change the color information of the icons such that the difference is not included in the critical range, so that the user may have difficulty recognizing the icons.

Figure 4A:
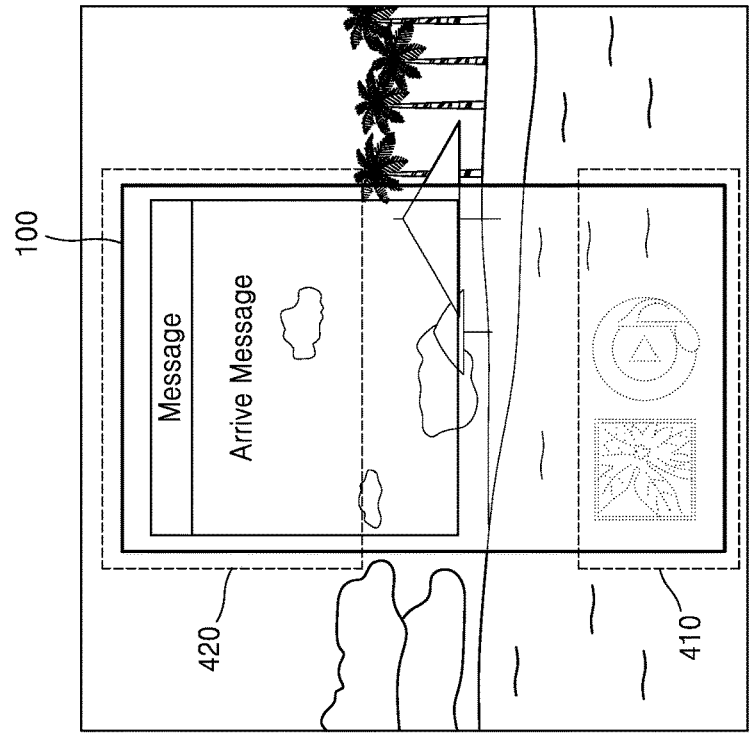
FIGS. 4A and 4B are views for describing a method used by a device to determine a color of displayed content based on the type of content, according to an embodiment.
Figure 4B:
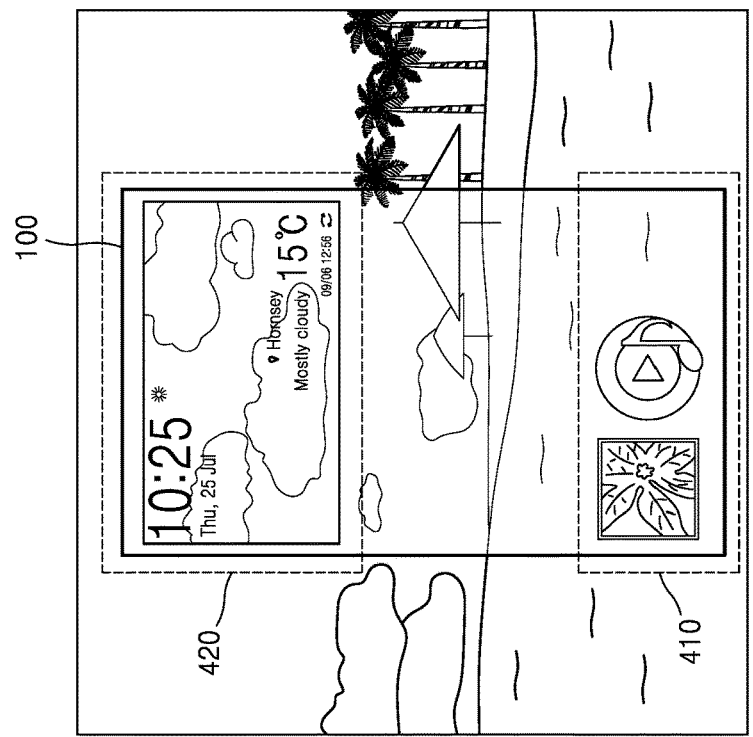

FIGS. 4A and 4B are views for describing a method used by the device 100 to determine a color of displayed content, based on the type of content, according to an embodiment.

Referring to FIGS. 4A and 4B, a menu application and a messenger application may be executed on the device 100. When the menu application is executed, icons 410 indicating a plurality of applications that are executable on the device 100 may be displayed on the device 100. Meanwhile, while the menu application is executed, a message 420 that is sent to a user may be displayed on the device 100. The second color information of the icons 410 of the applications and the second color information of the message 420, the icons 410 and the messages 420 being displayed on the device 100, may be recognized differently, based on the first color information of the object reflected on the transparent display of the device 100.

When the message 410 is received by the device 100, the device 100 may change the color information of the icons indicating the applications such that only the received message 410 may be recognized by the user. In the case of the transparent display, the second color information of the content, recognized by the user, is different based on the first color information of the project object, and thus, the device 100 may display the color information of the icons differently from the color information of the message, by taking into account the first color information of the reflected object.

For example, the difference in the color information, which enables the user to recognize the color information, may be set as a location difference of three spaces in a color rendering table. Also, it is assumed that a difference between the color information of the message 420 and the first color information of the reflected object corresponds to a location difference of two spaces in the color rendering table, and a difference between the color information of the icons 410 and the first color information of the reflected object corresponds to a location difference of four spaces in the color rendering table.

The device 100 may change the color information of the message 420 as a complementary color of the first color information of the object so that the received message 420 may be recognized by the user. For example, when the first color information of the object reflected on the device 100 is blue, the device 100 may change the color information of the message 420 as yellow which is in a complementary relationship with blue. Also, the device 100 may change the color information of the icons 410 as blue to be the same as the first color information of the object.

Since the device 100 may change the color information of the icons 410 and the color information of the message 420, the icons 410 and the message 420 being displayed on the device 100, based on the first color information of the object reflected on the transparent display of the device 100, the device 100 may easily provide information that is necessary for the user.

Figure 5:
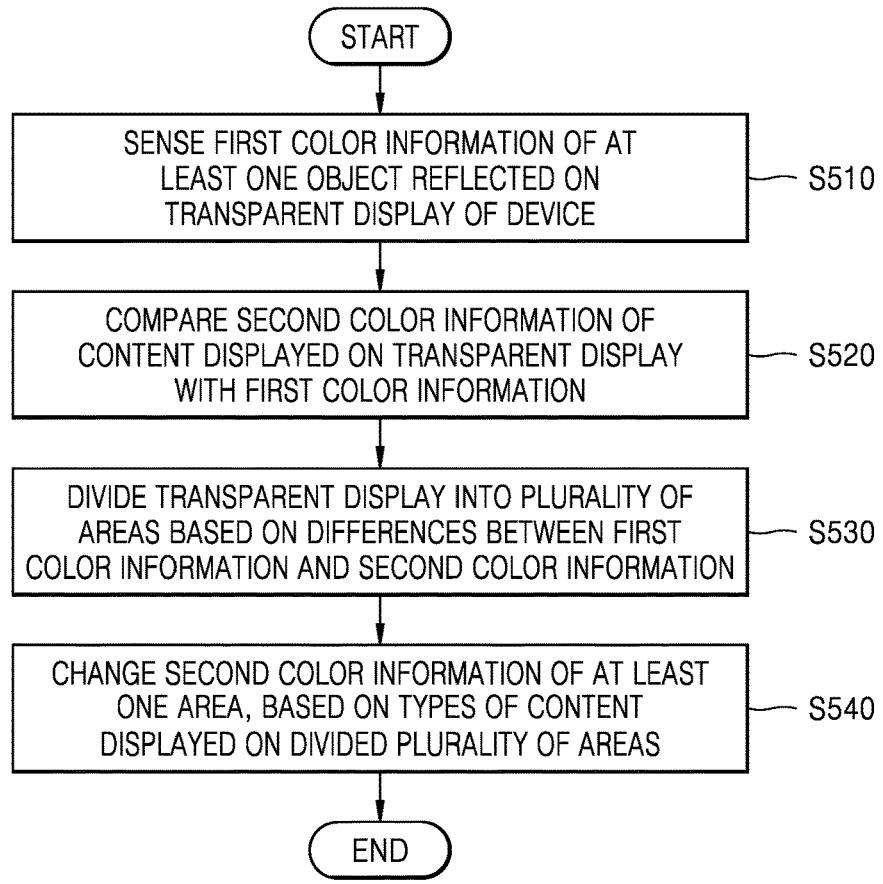
FIG. 5 is a flowchart of a method used by a device to change color information of displayed content by dividing a transparent display into a plurality of areas, according to an embodiment.

FIG. 5 is a flowchart of a method used by the device 100 to change color information of displayed content by dividing a transparent display into a plurality of areas, according to an embodiment.

In operation S510, the device 100 may sense first color information of at least one object reflected on the transparent display. The at least one object located around the device 100 may be reflected on the device 100.

Also, the first color information of the at least one object reflected on the device 100 may vary based on an eye direction of a user. The device 100 may sense the eye direction of the user and determine an object corresponding to the eye direction. The device 100 may sense the first color information of the determined object.

Operation S510 may correspond to operation S210 described above with reference to FIG. 2.

In operation S520, the device 100 may compare second color information of content displayed on the transparent display with the first color information.

At least one piece of content may be displayed on the device 100 according to an executed application. The device 100 may obtain the second color information of the content displayed on the transparent display. The device 100 may obtain the second color information of the content, by using metadata of the application. The metadata of the application may include information about a type, a size, a display location, and a color of content which is output when the application is executed.

Operation S520 may correspond to operation S220 described above with reference to FIG. 2.

In operation S530, the device 100 may divide the transparent display into a plurality of areas based on differences between the first color information and the second color information.

A plurality of objects may be reflected on the device 100. Also, a plurality of pieces of content may be displayed on the device 100. The device 100 may determine each difference between the color information of the plurality of pieces of content and the color information of the plurality of objects reflected on the device, wherein the plurality of pieces of content are displayed on locations corresponding to the plurality of objects, respectively.

For example, an object A may be reflected on a first area of the transparent display of the device 100 and an object B may be reflected on a second area of the transparent display. When content C is displayed on the device 100, a difference between the first color information of the object A and the second color information of the content C may be different from a difference between the first color information of the object B and the second color information of the content C.

The device 100 may divide the transparent display into a plurality of areas based on the determined differences in the color information. For example, the device 100 may divide the transparent display into an area on which the object A is reflected and an area on which the object B is reflected.

In operation S540, the device 100 may change the second color information of the content displayed on at least one area from among the divided plurality of areas.

According to an embodiment, the device 100 may change the second color information such that a difference between the first color information and the second color information is equal to or greater than a critical value. When a difference between a location of the first color information and a location of the second color information in a color rendering table is less than the critical value, the user may have difficulties in recognizing the second color information of the content displayed on the device 100. Thus, the device 100 may change the second color information such that the user may easily recognize the second color information.

For example, when the difference between the first color information of the object A and the second color information of the content C is less than the critical value, the device 100 may change the second color information displayed at a location corresponding to the object A such that the second color information has a complementary relationship with the first color information. Also, when the difference between the first color information of the object B and the second color information of the content C is equal to or greater than the critical value, the device 100 may not change the second color information of the content C displayed at a location corresponding to the object B.

However, this is only an embodiment, and the device 100 may change the second color information such that the difference between the first color information and the second color information is less than the critical value. When the difference between the first color information and the second color information is less than the critical value, the user of the device 100 may have difficulty recognizing the second color information. The device 100 may change the second color information of some pieces of content such that the second color information is similar to the first color information, so that the user may not recognize the pieces of content from among a plurality of pieces of content that are displayed.

For example, when the difference between the first color information of the object A and the second color information of the content C is less than the critical value, the device 100 may not change the second color information displayed on the location corresponding to the object A. Also, when the difference between the first color information of the object B and the second color information of the content C is equal to or greater than the critical value, the device 100 may change the second color information of the content C displayed on the location corresponding to the object B such that the difference is equal to or greater than the critical value.

Figure 6:
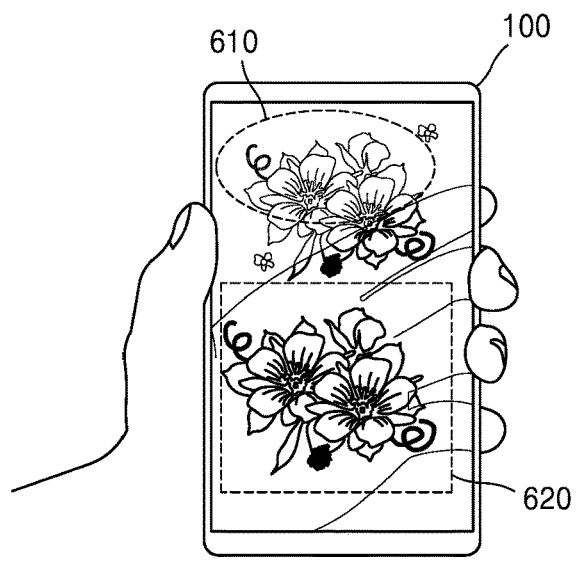
FIG. 6 is a view for describing a method used by a device to change color information of displayed content by dividing a transparent display into a plurality of areas, according to an embodiment.

FIG. 6 is a view for describing a method used by the device 100 to change color information of displayed content by dividing a transparent display into a plurality of areas, according to an embodiment.

Referring to FIG. 6, a stored image may be displayed on the device 100. For example, an image indicating a pink flower may be displayed on the device 100.

According to an embodiment, the device 100 may sense a plurality of objects reflected on the transparent display. For example, when a user holds the device 100 in his/her hands, the sky at a location where the device 100 is and the hands of the user may be reflected on the transparent display of the device 100.

The device 100 may determine a difference between the first color information of the reflected sky and the second color information of the pink flower that is displayed. Also, the device 100 may determine a difference between the first color information of the hand of the user that is reflected and the second color information of the pink flower. When the differences are equal to or greater than a predetermined value, the device 100 may divide the transparent display into a plurality of areas based on reflected objects.

In FIG. 6, it is assumed that the difference between the first color information of the sky and the second color information of the pink flower is equal to or greater than the difference between the first color information of the hand of the user and the second color information of the pink flower and a predetermined value. The device 100 may divide the transparent display into an area on which the sky is reflected and an area on which the hand of the user is reflected. For convenience of explanation, the area on which the sky is reflected will be described as a first area 610 and the area on which the hand of the user is reflected will be described as a second area 620.

Since the difference between the first color information of the sky and the second color information of the pink flower is equal to or greater than a critical value, the device 100 may not change the second color information of the pink flower displayed on the first area 610 on which the sky is reflected. Also, since the difference between the first color information of the hand of the user and the second color information of the pink flower is less than the critical value, the device 100 may change the second color information of the pink flower displayed on the second area 620 on which the hand of the user is reflected such that the difference between the first color information of the hand of the user and the second color information of the pink flower is equal to or greater than the critical value.

Figure 7:
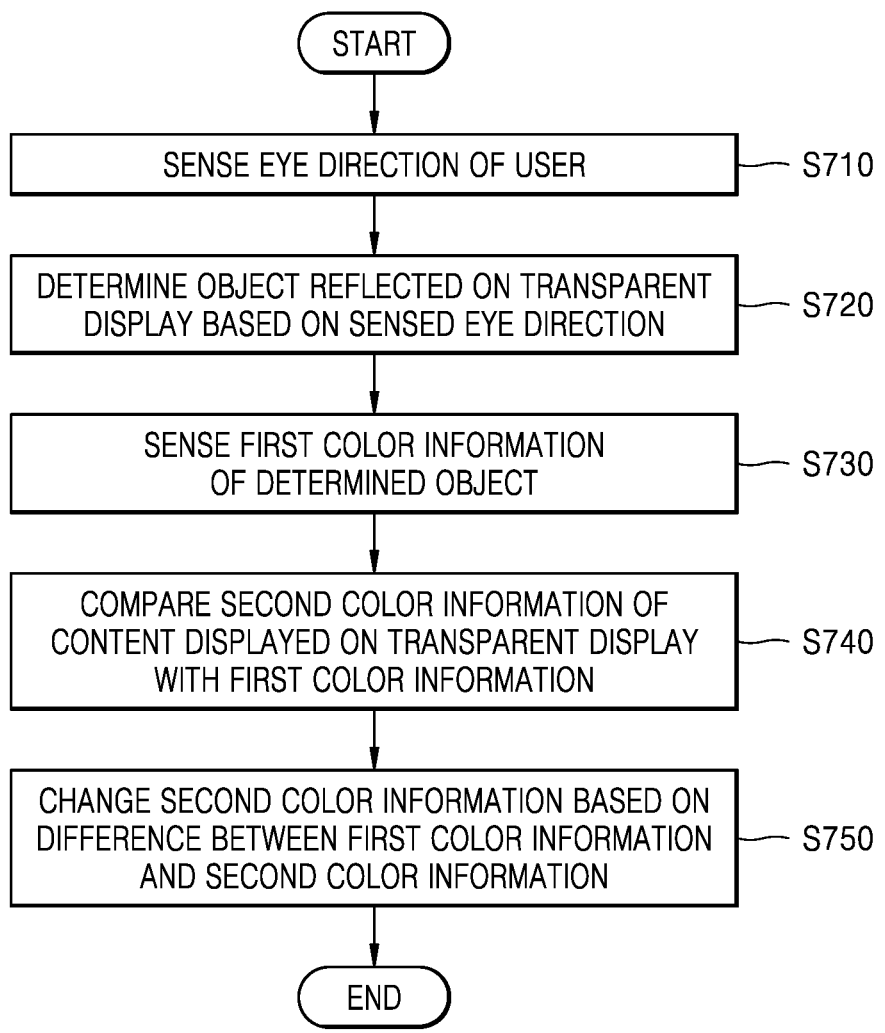
FIG. 7 is a flowchart of a method used by a device to change a color of displayed content based on an object that is reflected based on a sensed eye direction of a user, according to an embodiment.

FIG. 7 is a flowchart of a method used by the device 100 to change a color of displayed content based on an object that is reflected in a sensed eye direction of a user, according to an embodiment.

In operation S710, the device 100 may sense the eye direction of the user. The device 100 may sense a movement of the iris of the user, by using an iris sensor, etc. The device 100 may sense the eye direction of the user based on the sensed movement of the iris of the user.

However, this is only an embodiment. Methods of sensing the eye direction of the user on the device 100 are not limited thereto.

In operation S720, the device 100 may determine an object reflected on a transparent display, based on the sensed eye direction.

For example, when the user gazes at the device 100 in a horizontal direction, the device 100 may determine a cup located opposite the user in the horizontal direction based on the device 100, as the object.

As another example, when the user gazes at the device 100 in a diagonal direction, the device 100 may determine a chair located opposite the user in the diagonal direction based on the device 100, as the object.

In operation S730, the device 100 may sense first color information of the determined object.

The method of sensing the first color information of the determined object may correspond to operation S210 described above with reference to FIG. 2.

In operation S740, the device 100 may compare the first color information with second color information of content displayed on a transparent display of the device 100. At least one piece of content may be displayed on the device 100 according to an executed application.

The device 100 may obtain the second color information of the content displayed on the transparent display. The device 100 may obtain the second color information of the content, by using metadata related to the executed application. The metadata related to an application may include information of a type, a size, a display location, and a color of content which is output while the application is executed.

Operation S740 may correspond to operation S220 described above with reference to FIG. 2.

In operation S730, the device 100 may change the second color information based on a difference between the first color information and the second color information. In this case, methods of changing the second color information may vary according to user's settings.

According to an embodiment, the device 100 may change the second color information such that the difference between the first color information and the second color information is equal to or greater than a critical value. When a difference between a location of the first color information and a location of the second color information in a color rendering table is less than the critical value, the user may have difficulty recognizing the second color information of the content displayed on the device 100. Thus, the device 100 may change the second color information such that the user may easily recognize the second color information.

However, this is only an embodiment. The device 100 may change the second color information such that the difference between the first color information and the second color information is less than the critical value. When the difference between the first color information and the second color information is less than the critical value, the user of the device 100 may have difficulty recognizing the second color information. The device 100 may change the second color information of some pieces of content to be similar to the first color information so that the user may not recognize the pieces of content, from among a plurality of pieces of content that are displayed.

Operation S750 may correspond to operation S230 described above with reference to FIG. 2.

Figure 8:
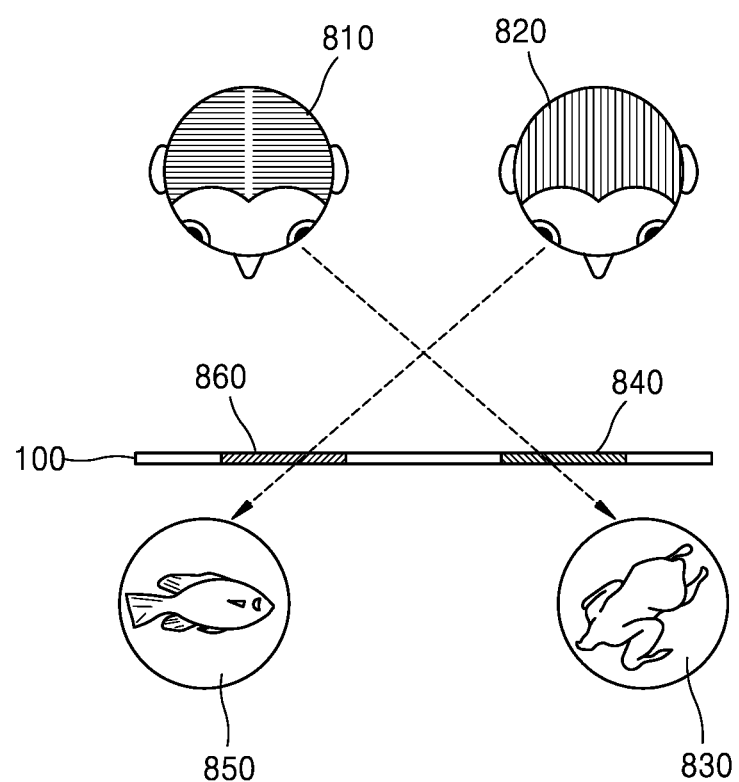
FIG. 8 is a view for describing a method used by a device to change second color information of displayed content by sensing objects reflected based on eye directions of different users, according to an embodiment.

FIG. 8 is a view for describing a method used by the device 100 to change second color information of displayed content, by sensing objects 830 and 850 that are reflected based on eye directions of different users 810 and 820, according to an embodiment.

Referring to FIG. 8, the plurality of users 810 and 820 may gaze at the device 100 that includes a transparent display. The different objects 830 and 850 may be reflected on the device 100 based on the eye directions of the plurality of users 810 and 820.

For example, user A 810 may gaze at the device 100 in a five o'clock direction. The device 100 may sense a movement of the iris of user A 810 and sense that the eye direction of user A 810 is the five o'clock direction. The device 100 may determine object A 830 that is at a location corresponding to the eye direction of user A 810.

The device 100 may compare second color information of content displayed on a location 840 corresponding to determined object A 830 with first color information of object A 830. Based on a difference between the second color information of the content displayed on the location 840 corresponding to object A 830, and the first color information of object A 830, the device 100 may change the second color information. For example, when the difference between the first color information of object A 830 and the second color information of the content displayed on the location 840 corresponding to object A 830 is less than a critical value determined based on a color rendering table, the device 100 may change the second color information of the content displayed on the location 840 corresponding to object A 830 such that the difference is equal to or greater than the critical value.

Also, user B 820 may gaze at the device 100 in a seven o'clock direction. The device 100 may sense a movement of the iris of user B 820 and sense that an eye direction of user B 820 is the seven o'clock direction. The device 100 may determine object B 850 that is at a location corresponding to the eye direction of user B 820.

The device 100 may compare second color information of content displayed on a location 860 corresponding to determined object B 850 with first color information of object B 850. Based on a difference between the second color information of the content displayed on the location 860 corresponding to object B 850 and the first color information of object B 850, the device 100 may change the second color information. For example, when the difference between the first color information of object B 850 and the second color information of the content displayed on the location 860 corresponding to object B 850 is equal to or greater than a critical value determined based on the color rending table, the device 100 may not change the second color information of the content displayed on the location 860 corresponding to object B 850.

However, this is only an embodiment, and the device 100 may be configured such that the device 100 may change the second color information, when the difference between the first color information of the object that is reflected and the second color information of the content that is displayed is equal to or greater than the critical value.

Figure 9A:
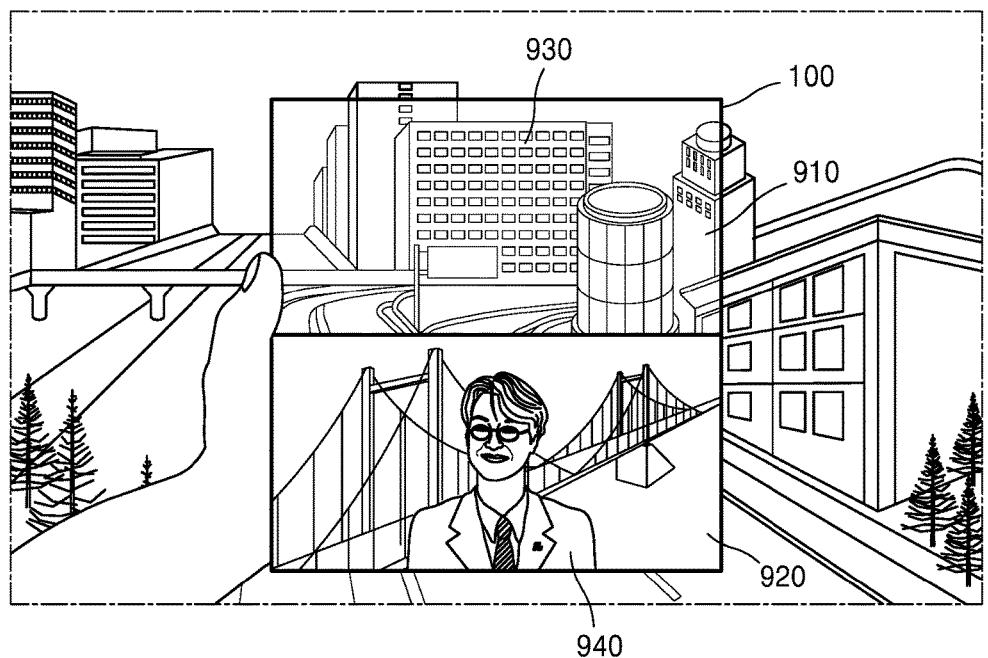
FIGS. 9A and 9B are views for describing a method used by a device to combine an image of an object that is reflected with displayed content, by sensing the object reflected based on an eye direction of a user, according to an embodiment.
Figure 9B:

FIGS. 9A and 9B are views for describing a method used by the device 100 to combine an image of an object that is reflected with displayed content, by sensing the object reflected in an eye direction of a user, according to an embodiment.

Referring to FIG. 9A, the device 100 may include a plurality of transparent displays 910 and 920.

A first object located opposite a location where a user is, with respect to the device 100, may be reflected on the first transparent display 910 of the device 100. The device 100 may generate an image 930 of the first object reflected on the first transparent display 910. For example, the device 100 may sense first color information of the first object that is reflected and generate the image 930 of the first object based on the sensed first color information.

A camera application may be executed on the second transparent display 920 of the device 100. Based on a user input, the device 100 may obtain an image 940 of a second object captured by a camera lens included in the device 100. For example, the device 100 may photograph a face of a user, captured by the camera lens.

Referring to FIG. 9B, the device 100 may generate an image 950 in which the image 930 of the first object and the image 940 of the second object are combined. When the device 100 combines the image 930 of the first object and the image 940 of the second object, the device 100 may change a color of the obtained image 940 of the second object, based on a difference between color information of the image 930 of the first object that is reflected and color information of the image 940 of the second object that is obtained by the device 100.

For example, when the difference between the color information of the image 930 of the first object and the color information of the image 940 of the second object is equal to or greater than a critical value, the device 100 may change the color information of the image 940 of the second object such that the difference increases. Also, when the difference between the color information of the image 930 of the first object and the color information of the image 940 of the second object is less than the critical value, the device 100 may change the color information of the image 940 of the second object such that the difference decreases.

However, this is only an embodiment, and the device 100 may change the color information of the image 930 of the first object, based on the difference between the color information of the image 930 of the first object and the color information of the image 940 of the second object.

Figure 10:
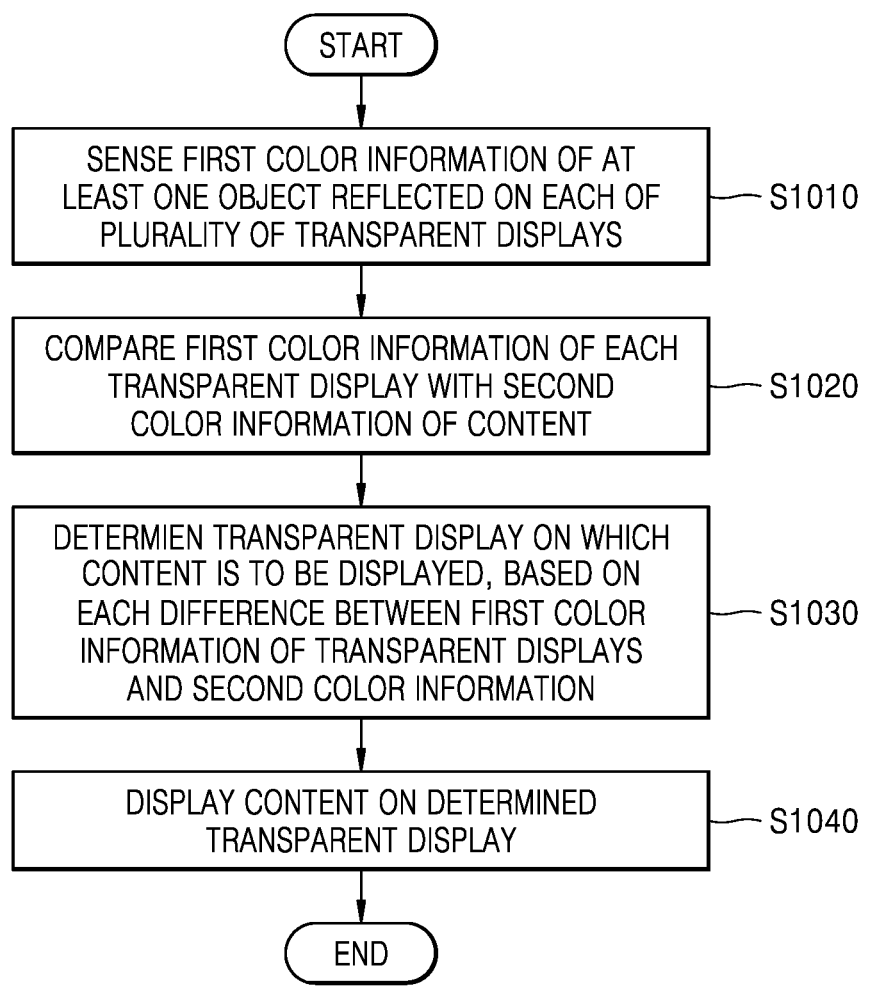
FIG. 10 is a flowchart of a method of changing a location of displayed content when a device includes a plurality of transparent displays, according to an embodiment.

FIG. 10 is a flowchart of a method of changing a location of displayed content when the device 100 includes a plurality of transparent displays, according to an embodiment.

In operation S1010, the device 100 may sense first color information of at least one object reflected on each of the plurality of transparent displays. Objects around the device 100 may be reflected on the plurality of transparent displays of the device 100.

Also, different objects may be reflected on the plurality of transparent displays of the device 100, based on eye directions of a user. The device 100 may determine the object reflected on each of the plurality of transparent displays by sensing the eye direction of the user.

In operation S1020, the device 100 may compare first color information of each of the transparent displays with second color information of content.

For example, the device 100 may compare color information of object A reflected on a first transparent display with second color information of content C displayed. Also, the device 100 may compare color information of object B reflected on a second transparent display with second color information of content D displayed.

Meanwhile, the content displayed on the first transparent display and the content displayed on the second transparent display may be the same.

In operation S1030, the device 100 may determine a transparent display on which the content is to be displayed, based on each difference between the first color information of the objects reflected on the transparent displays and the second color information of the content.

For example, when a difference between the first color information of object B reflected on the second transparent display and the second color information of content D displayed on the second transparent display is less than a critical value, and a difference between the first color information of object A reflected on the first transparent display and the second color information of content D displayed on the second transparent display is equal to or greater than the critical value, the device 100 may determine the first transparent display as the transparent display on which content D is to be displayed.

In operation S1040, the device 100 may display the content on the determined transparent display.

For example, the device 100 may display content D displayed on the second transparent display on the first transparent display. Thus, a location of the device 100, on which content D is displayed, may be changed from the second transparent display to the first transparent display.

Figure 11:
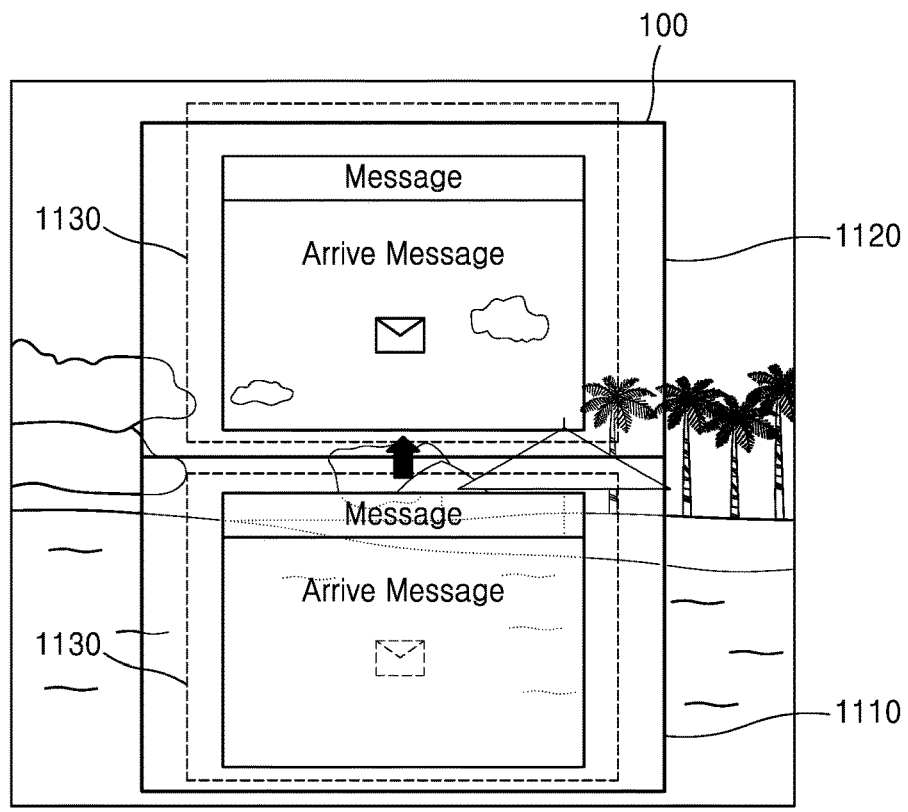
FIG. 11 is a view for describing a method of changing a location of displayed content when a device includes a plurality of transparent displays, according to an embodiment.

FIG. 11 is a view for describing a method of changing a location of displayed content when the device 100 includes a plurality of transparent displays 1110 and 1120, according to an embodiment.

Referring to FIG. 11, the device 100 may include the plurality of transparent displays 1110 and 1120.

When a messenger application is executed on the device 100, a message window 1130 displaying a received message may be displayed on the first transparent display 1110.

The device 100 may sense first color information of objects reflected on the first transparent display 1110 and the second transparent display 1120.

The device 100 may compare the first color information of the object reflected on the first transparent display 1110 with second color information of the message window 1130. Also, the device 100 may compare the first color information of the object reflected on the second transparent display 1120 with the second color information of the message window 1130.

When a difference between the first color information of the object reflected on the first transparent display 1110 and the second color information of the message window 1130 displayed on the first transparent display 1110 is less than a critical value, and a difference between the first color information of the object reflected on the second transparent display 1120 and the second color information of the message window 1130 is equal to or greater than the critical value, the device 100 may determine the second transparent display 1120 as the transparent display on which the message window 1130 is to be displayed. Thus, the location of the device 100, on which the message window 1130 is displayed, may be changed from the first transparent display 1110 to the second transparent display 1120.

Figure 12:
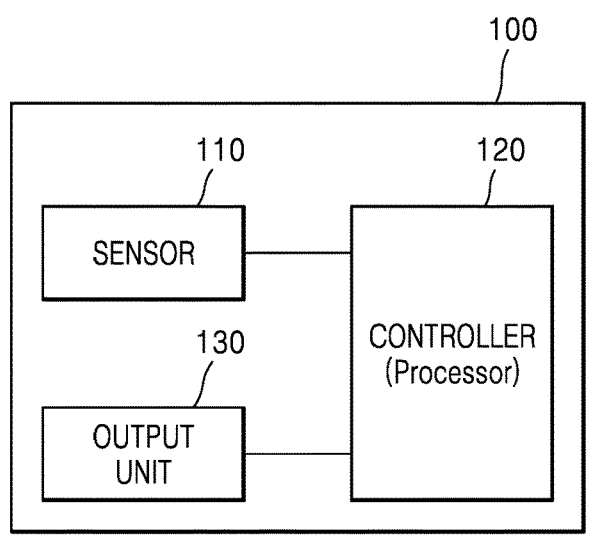
FIGS. 12 and 13 are block diagrams of a structure of a device, according to an embodiment.
Figure 13:
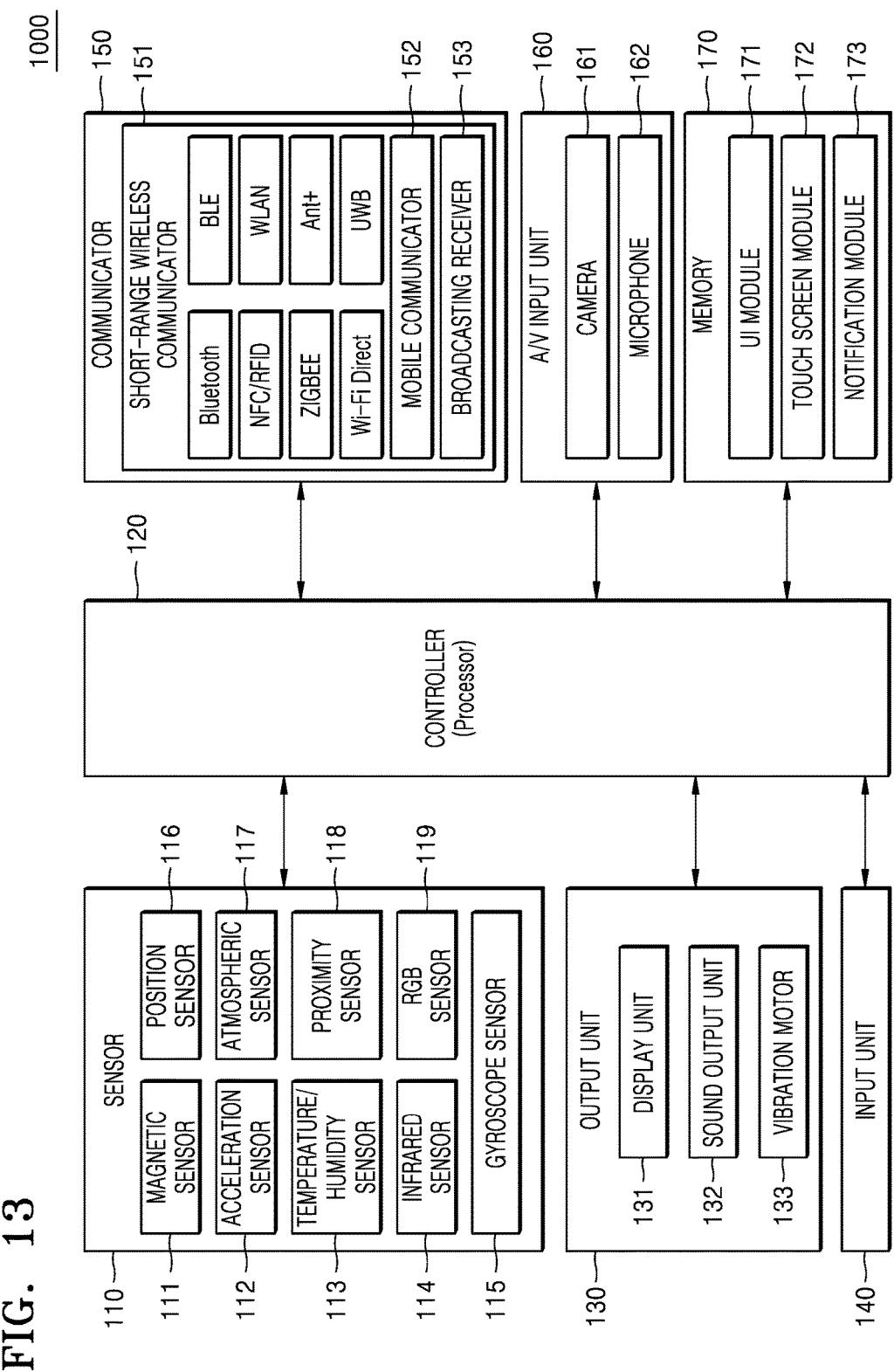

FIGS. 12 and 13 are block diagrams of a structure of the device 100, according to an embodiment.

As illustrated in FIG. 12, the device 100 according to an embodiment may include a sensor 110, a controller 120, and an output unit 130. However, not all of the illustrated components are essential components. Thus, the device 100 may be realized by including more or less components than the illustrated components.

For example, as illustrated in FIG. 13, the device 100 according to an embodiment may further include an input unit 140, a communicator 150, an audio/video (A/V) input unit 160, and a memory 170, in addition to the sensor 110, the controller 120, and the output unit 130.

Hereinafter, the above components will be sequentially described.

The sensor 110 may sense a state around the device 100 and transfer sensed information to the controller 120. The sensor 110 may sense first color information of at least one object reflected on a transparent display of the device 100, wherein the at least one object is located around the device 100.

The first color information of the at least one object reflected on the device 100 may vary based on an eye direction of a user. The sensor 110 may sense the eye direction of the user and determine an object corresponding to the eye direction. The sensor 110 may sense the first color information of the determined object.

The sensor 110 may include at least one of a magnetic sensor 111, an acceleration sensor 112, a temperature/humidity sensor 113, an infrared sensor 114, a gyroscope sensor 115, a position sensor (for example, global positioning system (GPS)) 116, an atmospheric sensor 117, a proximity sensor 118, and an illuminance sensor (an RGB sensor) 119. However, the sensor 110 is not limited thereto. The function of each sensor may be intuitively inferred from its name by one of ordinary skill in the art, and thus, a detailed description thereof will be omitted.

The controller 120 may control general operations of the device 100. For example, the controller 120 may generally control the sensor 110, the output unit 130, the input unit 140, the communicator 150, and the A/V input unit 160, by executing programs stored in the memory 170.

The controller 120 may compare second color information of content displayed on the transparent display with the first color information. The controller 120 may change the second color information based on a difference between the first color information and the second color information.

The controller 120 may change the second color information when the difference between the first color information and the second color information is included in a predetermined critical range. For example, the controller 120 may change the second color information such that the difference between the first color information and the second color information exceeds the predetermined critical range.

The controller 120 may determine an object reflected on the transparent display, based on the eye direction of the user that is sensed by the sensor 110, and sense the first color information of the determined object.

Also, the controller 120 may divide the transparent display into a plurality of areas based on differences between the first color information, and the second color information displayed on the transparent display. The controller 120 may select an area from among the plurality of divided areas, whereby the difference between the first color information and the second color information is included in the critical range, and change the color information of the selected area.

The controller 120 may generate an image corresponding to an object reflected on a first transparent display of the device 100. Based on a difference between second color information of content displayed on a second transparent display and the first color information of the generated image, the controller 120 may combine the displayed content with the generated image.

The controller 120 may determine at least one transparent display on which the content output is to be displayed, based on color information of an image of a first object reflected on the first transparent display and color information of an image of a second object reflected on the second transparent display.

Also, the controller 120 may determine the second color information that varies based on types of user inputs that are obtained.

The output unit 130 is configured to output an audio signal, a video signal, or a vibration signal, and may include a display unit 130, a sound output unit 132, a vibration motor 133, etc.

The display unit 131 may output content based on the second color information that is changed by the controller 120. Here, the display unit 131 may include a transparent material. The device 100 may include at least one display unit 131.

When the display unit 131 and a touch pad form a layer structure to realize a touch screen, the display unit 131 may be used as an input device in addition to an output device. The display unit 131 may include at least one of a liquid crystal display, a thin film transistor-liquid crystal display, an organic light-emitting diode, a flexible display, a three-dimensional (3D) display, and an electrophoretic display. Also, according to a realization type of the device 100, the device 100 may include two or more display units 131. Here, the two or more display units 131 may be arranged to face each other by using a hinge.

The sound output unit 132 may output audio data received from the communicator 150 or stored in the memory 170. Also, the sound output unit 132 may output sound signals (for example, call signal receiving sounds, message receiving sounds, notification sounds, etc.) related to functions performed in the device 100. The sound output unit 132 may include a speaker, a buzzer, etc.

The vibration motor 133 may output a vibration signal. For example, the vibration motor 133 may output vibration signals corresponding to outputs of audio data or video data (for example, call signal receiving sounds, message receiving sounds, etc.) Also, the vibration motor 133 may output vibration signals when a touch is input in a touch screen.

The input unit 140 refers to a device used by a user to input data to control the device 100. For example, the input unit 140 may include a key pad, a dome switch, a touch pad (a touch-type capacitance method, a pressure-type resistive method, an infrared sensing method, a surface ultrasonic conductive method, an integral tension measuring method, a piezo effect method, etc.), a jog wheel, a jog switch, etc. However, the input unit 140 is not limited thereto.

Also, the input unit 140 may obtain a user input for changing the second color information of content.

The communicator 150 may include one or more components that enable communication between the device 100 and an external device or between the device 100 and a server. For example, the communicator 150 may include a short-range wireless communicator 151, a mobile communicator 152, and a broadcasting receiver 153.

The short-range wireless communicator 151 may include a Bluetooth communicator, a Bluetooth low energy communicator, a near field communicator, a WLAN (Wifi) communicator, a Zigbee communicator, an infrared data association (IrDA) communicator, a Wifi direct (WFD) communicator, a ultra wideband (UWB) communicator, an Ant+ communicator, etc. However, the short-range wireless communicator 151 is not limited thereto.

The mobile communicator 152 may exchange wireless signals with at least one of a base station, an external device, and a server through a mobile communication network. The wireless signals may include various types of data based on an exchange of a voice call signal, a video call signal, or a text/multimedia message.

The broadcasting receiver 153 may receive a broadcasting signal and/or information related to broadcasting from the outside via a broadcasting channel. The broadcasting channel may include a satellite channel and a ground wave channel. According to an embodiment, the device 100 may not include the broadcasting receiver 153.

The A/V input unit 160 is configured to input an audio signal or a video signal, and may include a camera 161, a microphone 162, etc.

The camera 161 may obtain an image frame, such as a still image or a video, via an image sensor in a video call mode or a photographing mode. An image captured by the image sensor may be processed by the controller 120 or an additional image processor (not shown).

The image frame obtained by the camera 161 may be stored in the memory 170 or transferred to the outside via the communicator 150. According to an embodiment, the device 100 may include two or more cameras 161.

The microphone 162 may receive an external sound signal and process the received external sound signal into electrical sound data. For example, the microphone 162 may receive a sound signal from an external device or a speaker. The microphone 162 may use various noise removal algorithms to remove noise generated in the process of receiving external sound signals.

The memory 170 may store programs for processing and controlling the controller 120, or may store data that is input or output.

The memory 170 may include at least one type of storage medium of a flash memory type, a hard disk type, a multimedia card micro type, a card type (for example, SD or XD memory), random access memory (RAM), static random access memory (SRAM), read-only memory (ROM), electrically erasable programmable read-only memory (EEPROM), programmable read-only memory (PROM), magnetic memory, a magnetic disk, and an optical disk. Also, the device 100 may operate a web storage or a cloud server that performs a storage function of the memory 170 through the internet.

The programs stored in the memory 170 may be divided into a plurality of modules based on functions thereof. For example, the programs may be divided into a user interface (UI) module 171, a touch screen module 172, a notification module 173, etc.

The UI module 171 may provide UIs, graphic UIs, etc. that are specified for applications in connection with the device 100. The touch screen module 172 may sense a touch gesture on a touch screen of a user and transfer information about the touch gesture to the controller 120. The touch screen module 172 according to an embodiment may recognize and analyze a touch code. The touch screen module 172 may be formed as additional hardware including a controller.

Various sensors may be provided in or around the touch screen to sense a touch or a proximate touch on the touch screen. A touch sensor is an example of the sensor for sensing a touch on the touch screen. The touch sensor refers to a sensor that is configured to sense a touch of a specific object in or over the extent in which a human senses. The touch sensor may sense various information related to roughness of a contact surface, rigidity of a contact object, a temperature of a contact point, etc.

Also, a proximity sensor is another example of the sensor for sensing a touch on the touch screen.

The proximity sensor refers to a sensor that is configured to sense whether an object is approaching or is around a predetermined sensing surface by using a force of an electromagnetic field or infrared rays, without any mechanical contact. Examples of the proximity sensor include a transmissive photoelectric sensor, a direct-reflective photoelectric sensor, a mirror-reflective photoelectric sensor, a high-frequency oscillating proximity sensor, a capacitance proximity sensor, a magnetic-type proximity sensor, an infrared proximity sensor, etc. The touch gesture of a user may include tapping, touching & holding, double tapping, dragging, panning, flicking, dragging and dropping, swiping, etc.

The notification module 173 may generate a signal for notifying an occurrence of an event on the device 100. Examples of the occurrence of an event on the device 100 may include receiving a call signal, receiving a message, inputting a key signal, notifying a schedule, etc. Also, when an event schedule with respect to review content 105, which is predetermined by a user, is within a predetermined period, the notification module 173 may notify the user about the event. The notification module 173 may output a notification signal as a video signal via the display unit 131, as an audio signal via the sound output unit 1332, or as a vibration signal via the vibration motor 133.

The method of the present invention may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a compiler.

While the present invention has been particularly shown and described with reference to the exemplary embodiments thereof, it will be understood by one of ordinary skill in the art that various changes in form and details may be made therein without departing from the spirit and scope of the present invention as defined by the following claims. Hence, it will be understood that the exemplary embodiments described above are not limiting of the scope of the invention. For example, each component described in a single type may be executed in a distributed manner, and components described distributed may also be executed in an integrated form.

The scope of the present invention is indicated by the claims rather than by the detailed description of the invention, and it should be understood that the claims and all modifications or modified forms drawn from the concept of the claims are included in the scope of the present invention.

The invention claimed is:

1. A method of displaying content on a device, the method comprising:
    sensing first color information of at least one object projected on a transparent display of the device;
    comparing second color information of the content displayed on the transparent display of the device with the first color information;
    dividing the transparent display of the device into a plurality of areas based on a difference between the first color information and the second color information;
    selecting an area in which the difference between the first color information and the second color information is within a predetermined range from among the plurality of areas;
    changing color information of the selected area; and
    displaying the selected area of the transparent display of the device based on the changed color information.

2. The method of claim 1, wherein the changing of the color information comprises changing the color information of the selected area when the difference between the first color information and the second color information is within the predetermined range.

3. The method of claim 1, further comprising:
    sensing an eye direction of a user; and
    determining the at least one object projected on the transparent display of the device, based on the sensed eye direction,
    wherein the sensing of the first color information comprises sensing the first color information of the determined at least one object.

4. The method of claim 1, wherein the transparent display of the device comprises a first transparent display and a second transparent display and the method further comprises:
    generating an image corresponding to a first object projected on the first transparent display; and
    based on a difference between color information of content displayed on the second transparent display and color information of the generated image, combining the content displayed on the second transparent display with the generated image.

5. The method of claim 1, wherein the transparent display of the device comprises a first transparent display and a second transparent display and the method further comprises:
    based on color information of an image of a first object projected on the first transparent display and an image of a second object projected on the second transparent display, determining at least one of the first and second transparent displays on which the content is to be displayed.

6. The method of claim 1, wherein the changing of the color information of the selected area comprises determining the color information that is changed, based on types of obtained user inputs.

7. A device for displaying content, the device comprising:
    a transparent display;
    a sensor configured to sense first color information of at least one object projected on the transparent display; and
    at least one computer processor configured to:
    compare second color information of the content displayed on the transparent display with the first color information, divide the transparent display of the device into a plurality of areas based on a difference between the first color information and the second color information, select an area in which the difference between the first color information and the second color information is within a predetermined range from among the plurality of areas, change color information of the selected area; and control the transparent display to display the selected area of the transparent display based on the changed color information.

8. The device of claim 7, wherein the at least one computer processor is configured to change the color information of the selected area when the difference between the first color information and the second color information is within the predetermined range.

9. The device of claim 7, wherein the sensor is configured to sense an eye direction of a user, and the at least one processor is configured to determine the at least one object projected on the transparent display, based on the sensed eye direction, and sense the first color information of the determined at least one object.

10. The device of claim 7, wherein the transparent display comprises a first transparent display and a second transparent display and the at least one computer processor is configured to generate an image corresponding to a first object projected on the first transparent display, and based on a difference between color information of content displayed on the second transparent display and color information of the generated image, combine the content displayed on the second transparent display with the generated image.

11. The device of claim 7, wherein the transparent display comprises a first transparent display and a second transparent display and the at least one computer processor is configured to determine at least one of the first and second transparent displays on which the content is to be displayed, based on color information of an image of a first object projected on the first transparent display and an image of a second object projected on the second transparent display.

12. The device of claim 7, wherein the at least one computer processor is configured to determine the color information that is changed, based on types of obtained user inputs.

13. A non-transitory computer-readable recording medium having embodied thereon a program which, when executed by at least one computer processor of a device for displaying content, causes the device to perform operations comprising:

sensing first color information of at least one object projected on a transparent display of the device;

comparing second color information of the content displayed on the transparent display of the device with the first color information;

dividing the transparent display of the device into a plurality of areas based on a difference between the first color information and the second color information;

selecting an area in which the difference between the first color information and the second color information is within a predetermined range from among the plurality of areas;

changing color information of the selected area; and displaying the selected area of the transparent display of the device based on the changed color information.

* * * * *